United States Patent
Mizobata et al.

(10) Patent No.: US 10,500,991 B2
(45) Date of Patent: Dec. 10, 2019

(54) VEHICLE SEAT

(71) Applicant: TOYOTA BOSHOKU KABUSHIKI KAISHA, Aichi-ken (JP)

(72) Inventors: Hiroshi Mizobata, Aichi-ken (JP); Fumitoshi Akaike, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/170,992

(22) Filed: Jun. 2, 2016

(65) Prior Publication Data

US 2016/0362026 A1  Dec. 15, 2016

(30) Foreign Application Priority Data

Jun. 11, 2015 (JP) .................................. 2015-118284

(51) Int. Cl.
*B60N 2/28* (2006.01)
*B60N 2/68* (2006.01)

(52) U.S. Cl.
CPC ............. *B60N 2/2887* (2013.01); *B60N 2/68* (2013.01)

(58) Field of Classification Search
CPC .... B60N 2/2898; B60N 2/2887; B60N 2/289; B60N 2/2893; B60N 2/68
USPC .......................... 297/452.18, 253; 248/503.1
See application file for complete search history.

(56) References Cited

U.S. PATENT DOCUMENTS

| | | | | |
|---|---|---|---|---|
| 6,390,560 B1 * | 5/2002 | Gandhi | .................... | B60N 2/28 297/253 |
| 6,634,710 B1 * | 10/2003 | Adamson, Sr. | ........ | B60N 2/289 248/503.1 |
| 7,338,121 B1 * | 3/2008 | Pilcher | ................. | B60N 2/0232 297/253 |
| 8,328,280 B2 * | 12/2012 | Parker | .................. | B60N 2/2887 297/236 |
| 8,740,289 B2 * | 6/2014 | Oancea | .................. | B60N 2/289 296/193.01 |
| 2004/0051356 A1 * | 3/2004 | Neelis | .................. | B60N 2/2809 297/253 |
| 2004/0080194 A1 * | 4/2004 | Medvecky | ........... | B60N 2/2887 297/253 |
| 2004/0080195 A1 * | 4/2004 | Adams | ................. | B60N 2/2887 297/253 |

(Continued)

FOREIGN PATENT DOCUMENTS

| | | | | |
|---|---|---|---|---|
| DE | 102014207556 B3 * | 8/2015 | ............. | B60N 2/289 |
| EP | 0694436 A1 * | 1/1996 | ........... | B60N 2/2821 |

(Continued)

OTHER PUBLICATIONS

Japanese Office Action in counterpart application No. JP2015-118284, dated Oct. 30, 2018 (with partial English-language translation thereof).

*Primary Examiner* — Milton Nelson, Jr.

(74) *Attorney, Agent, or Firm* — Greenblum & Bernstein, P.L.C.

(57) ABSTRACT

A vehicle seat includes a lower anchorage that serves as an attachment member for a child safety seat; a bracket; and a base frame that is provided on or above a vehicle body. The lower anchorage is fixed to the base frame via the bracket; and the lower anchorage is integrally assembled to the bracket, with contours of the lower anchorage and the bracket being in contact with each other in a front-rear direction.

13 Claims, 14 Drawing Sheets

(56) References Cited

U.S. PATENT DOCUMENTS

| | | | | |
|---|---|---|---|---|
| 2004/0261246 A1* | 12/2004 | Duffy | ................ | B60N 2/286 |
| | | | | 29/509 |
| 2005/0057016 A1* | 3/2005 | Martinez | ............. | B60N 2/2887 |
| | | | | 280/124.152 |
| 2010/0109215 A1* | 5/2010 | Ruthinowski | ........ | B60N 2/2809 |
| | | | | 267/140.13 |
| 2012/0241584 A1* | 9/2012 | McLeod | ............ | B60N 2/2887 |
| | | | | 248/503.1 |
| 2013/0147246 A1* | 6/2013 | Nakakita | ............ | B60N 2/2893 |
| | | | | 297/253 |
| 2014/0042784 A1* | 2/2014 | Yoshitsuru | ............... | B60N 2/43 |
| | | | | 297/216.11 |

FOREIGN PATENT DOCUMENTS

| | | | | | |
|---|---|---|---|---|---|
| FR | 2905091 | A1 * | 2/2008 | .......... | B60N 2/2887 |
| JP | 2000203318 | A | 7/2000 | | |
| JP | 2001-105941 | | 4/2001 | | |
| JP | 2002211287 | A | 7/2002 | | |
| JP | 2003048467 | A | 2/2003 | | |
| JP | 2003094993 | A | 4/2003 | | |
| JP | 4193242 | B2 * | 12/2008 | ........... | B60N 2/2893 |
| JP | 4427887 | B2 * | 3/2010 | ........... | B60N 2/2893 |
| JP | 2012-131404 | | 7/2012 | | |
| JP | 2012-180047 | | 9/2012 | | |
| JP | 2014-4881 | | 1/2014 | | |
| JP | 2014-151660 | | 8/2014 | | |
| WO | WO-2005069985 | A2 * | 8/2005 | ............... | B21F 5/00 |

* cited by examiner

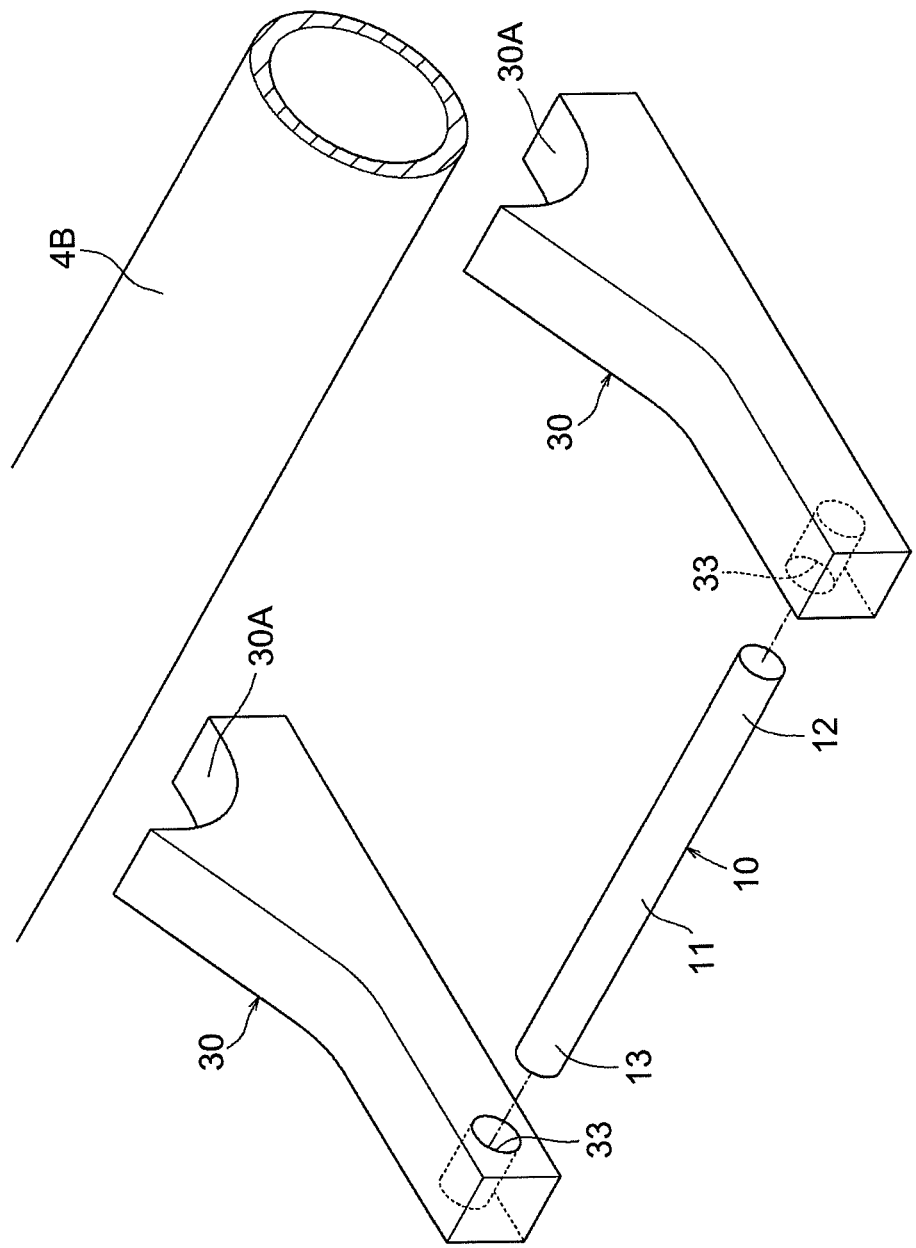

VEHICLE SEAT

INCORPORATION BY REFERENCE

The disclosure of Japanese Patent Application No. 2015-118284 filed on Jun. 11, 2015 including the specification, drawings and abstract is incorporated herein by reference in its entirety.

BACKGROUND OF THE INVENTION

1. Field of the Invention

The invention relates to a vehicle seat. More specifically, the invention relates to a vehicle seat in which a lower anchorage serving as an attachment member for a child safety seat is fixed to a base frame that is provided on or above a vehicle body via a bracket.

2. Description of Related Art

Conventionally, there is known a vehicle seat in which a lower anchorage in the form of a wire that is used to retain an ISOFIX-type child safety seat is attached to a pipe member via a bracket in the form of a thin plate, the pipe member being provided between both side frames of a seat cushion to connect the both side frames (Japanese Patent Application Publication No. 2014-151660 (JP 2014-151660 A)). Specifically, in this configuration, the lower anchorage, the bracket and the pipe member are made of iron, and contacting regions thereof are firmly and integrally connected to each other through welding.

However, the related art adopts the configuration in which the lower anchorage in the form of a wire is welded to the bracket in the form of a thin plate. Therefore, inconveniences such as burn-through are likely to be caused due to the influence of heat input at the time of welding.

SUMMARY OF THE INVENTION

The invention makes it possible to assemble a lower anchorage to a base frame such that the lower anchorage has appropriate strength.

An aspect of the invention relates to a vehicle seat including a lower anchorage that serves as an attachment member for a child safety seat; a bracket; and a base frame that is provided on or above a vehicle body. The lower anchorage is fixed to the base frame via the bracket; and the lower anchorage is integrally assembled to the bracket, with contours of the lower anchorage and the bracket being in contact with each other in a front-rear direction.

With the configuration, the lower anchorage can be assembled to the bracket in the state where the lower anchorage is in contact with the bracket in the front-rear direction and is supported by the bracket. Accordingly, the lower anchorage can be assembled to the base frame such that the lower anchorage has appropriate strength.

In the above aspect, the lower anchorage may be integrally assembled to the bracket in a state where the lower anchorage is in contact with the bracket in the front-rear direction, by an insertion connection structure.

With the configuration, the lower anchorage can be assembled to the bracket in a simplified manner such that the lower anchorage has appropriate strength.

In the above aspect, in the insertion connection structure, an end portion of the lower anchorage may be inserted into the bracket such that the end portion is restrained from being pulled in a direction opposite to a direction in which the end portion is inserted into the bracket, and the end portion may be integrally assembled to the bracket in a state where the end portion is in contact with the bracket in the front-rear direction.

With the configuration, the lower anchorage can be directly assembled to the bracket in a simplified manner such that the lower anchorage has appropriate strength, without using a separate fastening component.

In the above aspect, in the insertion connection structure, the end portion of the lower anchorage may be connected to the bracket with contours of the end portion and the bracket being in contact with each other in the front-rear direction, by engagement of threads.

With the simple configuration that makes it possible to manually assemble the lower anchorage to the bracket, the lower anchorage can be assembled to the bracket such that the lower anchorage has appropriate strength.

In the above aspect, the lower anchorage may be formed of a bent wire; and at least one end of the lower anchorage may be fastened to the bracket by engagement of threads and another end of the lower anchorage is inserted into the bracket such that the lower anchorage is integrally assembled to the bracket in a state where the lower anchorage is restrained from rotating around the one end.

With the configuration, the lower anchorage is stopped from rotating in the state where at least one end of the lower anchorage is fastened to the bracket by engagement of the threads. Therefore, with the simple configuration, the lower anchorage can be assembled to the bracket such that the lower anchorage has appropriate strength.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is an exploded perspective view of FIG. 13.

DETAILED DESCRIPTION OF EMBODIMENTS

Embodiments of the invention will be described with reference to the drawings.

Figure 1:
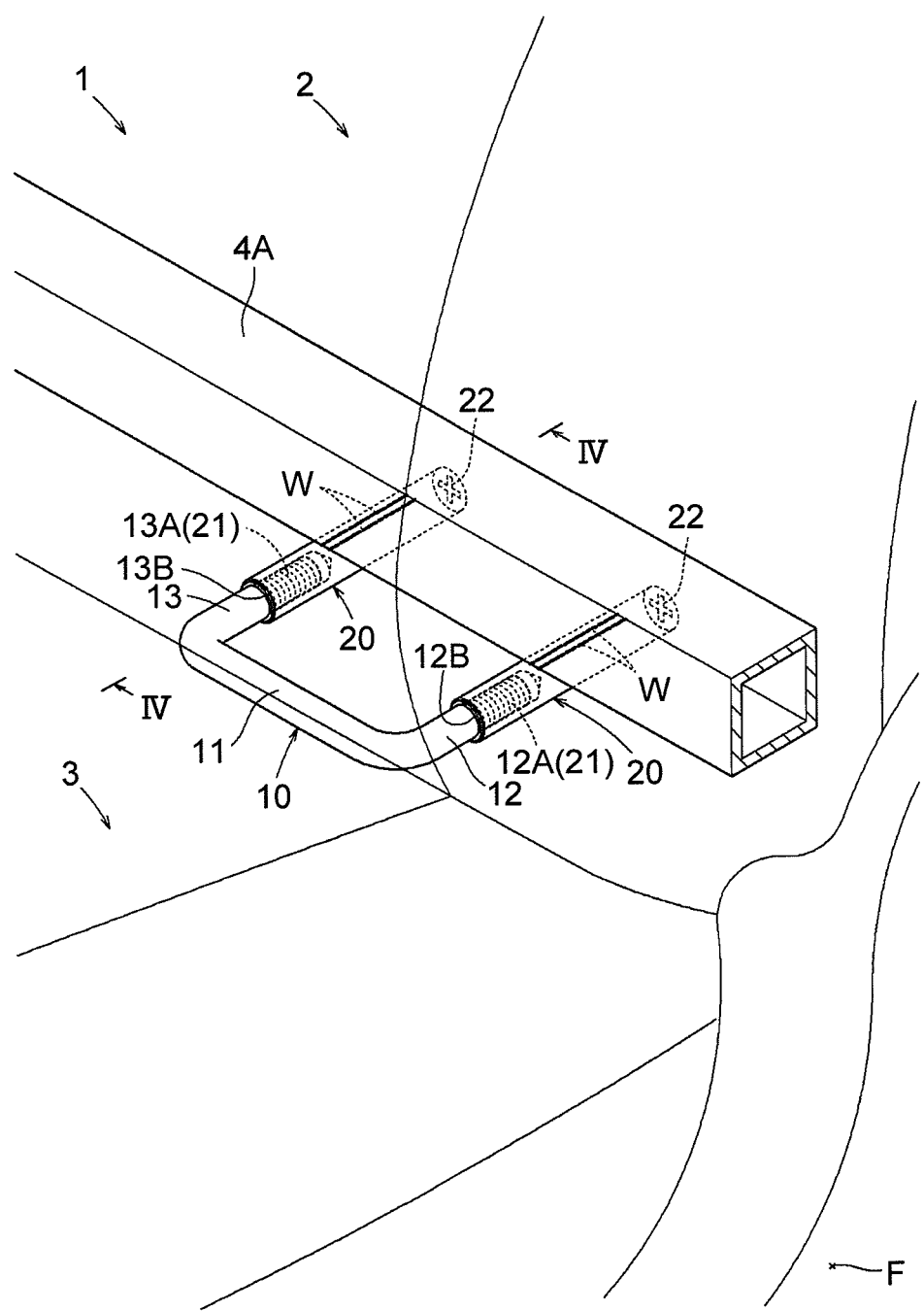
FIG. 1 is a perspective view illustrating, in an enlarged manner, the structure of a main part of a vehicle seat according to a first embodiment of the invention.

First, the configuration of a seat 1 (a vehicle seat) according to a first embodiment of the invention will be described using FIGS. 1 to 4. As shown in FIG. 1, the seat 1 according to the embodiment is configured as a rear seat of an automobile (a vehicle), and includes a seat back 2 that serves as a backrest for a seated occupant, and a seat cushion 3 that serves as a seating portion. A pair of right and left lower anchorages 10 (only one of which is shown) that is used to retain an ISOFIX-type child safety seat (not shown) is provided at rear end portions of the seat cushion 3 so as to be exposed in the back of a gap between the seat cushion 3 and the seat back 2.

The configuration in which the lower anchorages 10 of the ISOFIX type are respectively provided at the rear end portions of the seat cushion 3 so as to be exposed in the back of the gap between the seat cushion 3 and the seat back 2 as described above is a general configuration that is identical to those disclosed in documents such as Japanese Patent Application Publication No. 2014-004881 (JP 2014-004881 A), Japanese Patent Application Publication No. 2012-180047 (JP 2012-180047 A), and Japanese Patent Application Publication No. 2012-131404 (JP 2012-131404 A). Therefore, a concrete description of the arrangement will be omitted.

The lower anchorages 10 are configured to be integrally fixed to a quadrangular tubular lower pipe 4A via brackets 20. The lower pipe 4A is integrally provided between rear end portions of side frames (not shown) of the seat cushion 3 to connect the rear end portions of the side frames. The lower pipe 4A may be regarded as "base frame" of the invention. The lower pipe 4A is integrally connected to framework portions (not shown) of the seat cushion 3 as described above. Thus, due to a configuration in which the framework portions of the seat cushion 3 are provided so as to be integrally fixed onto a floor panel F of a vehicle, the lower pipe 4A is integrally fixed to the floor panel F via the framework portions of the seat cushion 3.

The lower anchorages 10 are made of iron, and the brackets 20 and the lower pipe 4A are made of aluminum alloy. The brackets 20 are firmly and integrally connected to the lower pipe 4A that is made of the same material as the material of which the brackets 20 are made, through welding (at welding locations W). On the other hand, the lower anchorages 10 are firmly and integrally connected to the brackets 20 that are made of the material different from the material of which the lower anchorages 10 are made, by a thread engagement structure (an insertion connection structure) without using welding.

Due to the above-described connection, the lower anchorages 10 are firmly and integrally fixed to the lower pipe 4A via the brackets 20. The lower anchorages 10 are fixed to the lower pipe 4A as described above, and therefore the lower anchorages 10 have high structural strength that makes it possible to connect corresponding attachment members of the child safety seat (not shown) to the lower anchorages 10 from the seat front side so as to fit the corresponding attachment members to the lower anchorages 10, and to maintain the attachment members in a fitted state even when a large load is input thereto in the event of a collision of the vehicle or the like. In this manner, the lower anchorages 10 are connected to the brackets 20, which are made of the material different from the material of which the lower anchorages 10 are made, such that the lower anchorages 10 have appropriate strength, without using welding.

Figure 2:
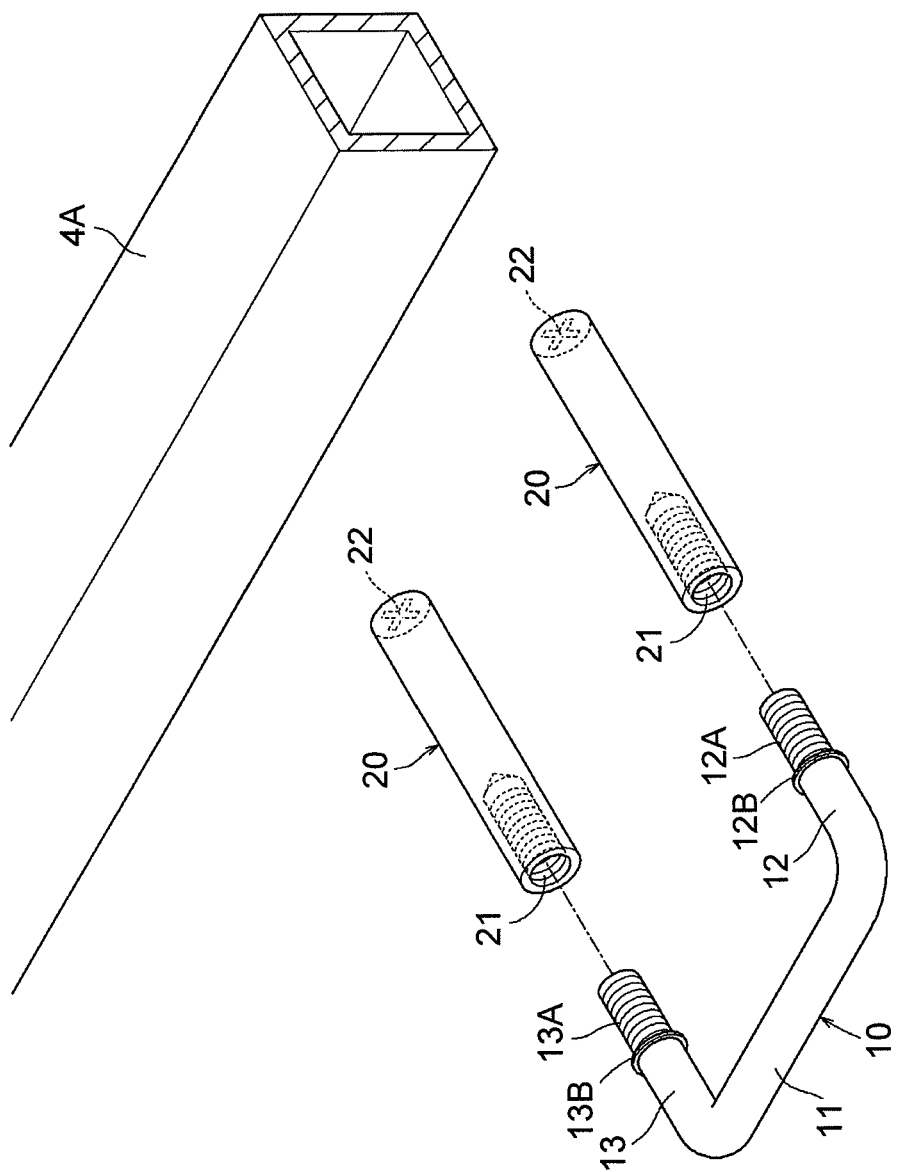
FIG. 2 is an exploded perspective view of FIG. 1.

The connection structure for connecting each of the lower anchorages 10 to a corresponding one of the brackets 20 and the basic structure of the lower anchorage 10 and the bracket 20 will be described in detail using the FIGS. 1 to 4. The configuration of the lower anchorage 10, the configuration of the bracket 20, and the connection structure thereof on the right side are identical to those on the left side. Therefore, only the configuration on one side shown in the drawings will be described hereinafter as a representative. As shown in FIGS. 1 and 2, the lower anchorage 10 is formed by bending a single steel wire into a substantially U shape in a plan view. The steel wire is formed in the shape of a solid round bar.

Due to the above-described bending, the lower anchorage 10 is configured such that a central link part in the U-shaped lower anchorage 10 serves as an attachment portion 11, the corresponding attachment member of the child safety seat (not shown) is connected to the attachment portion 11 from the seat front side, and a hook is disposed to reach the rear side of the attachment portion 11 to engage with the attachment portion 11. The lower anchorage 10 is configured such that parts, which are disposed in right and left end sides in the U-shaped lower anchorage 10 and extend toward the seat rear side, serve as leg portions 12, 13, and the leg portions 12, 13 are connected to seat front-side end portions of the respective brackets 20 having the same length, by the thread engagement structure.

More specifically, male thread portions 12A and 13A extending in the same rotational direction are respectively formed at rear-side end portions of the leg portions 12 and 13 of the lower anchorage 10. The male thread portions 12A and 13A are formed to extend to the same position (i.e., to have the same length) in the leg portions 12 and 13 on the right and left sides. Also, flanges 12B and 13B, which project in the shape of a circular disc to partially increase the radii of the leg portions 12 and 13, are formed at terminal end locations of the male thread portions 12A and 13A of the leg portions 12 and 13. The flanges 12B and 13B function as stoppers that set the maximum screwing positions in screwing the male thread portions 12A and 13A of the leg portions 12 and 13 into threaded holes 21 of the corresponding brackets 20.

Figure 4:
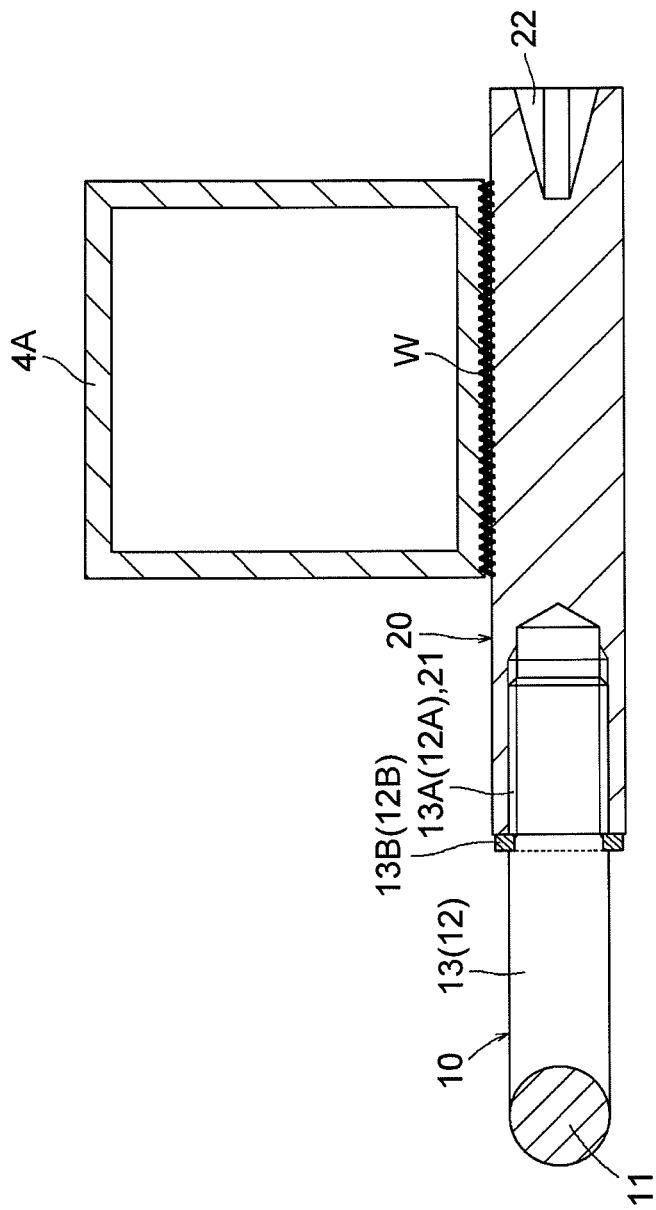
FIG. 4 is a sectional view of FIG. 1 taken along a line IV-IV.
Figure 5:
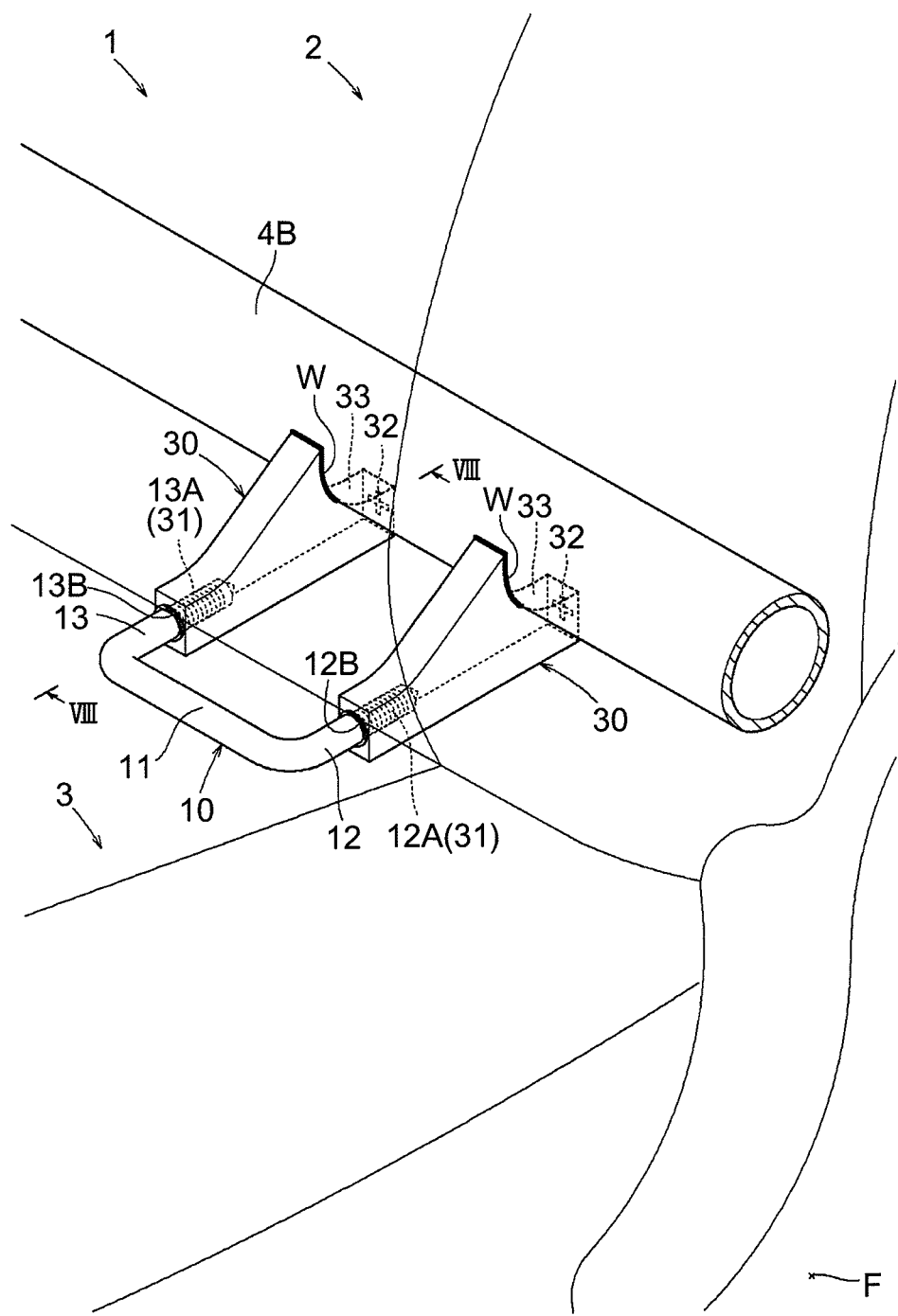
FIG. 5 is a perspective view illustrating, in an enlarged manner, the structure of a main part of a vehicle seat according to a second embodiment of the invention.
Figure 6:
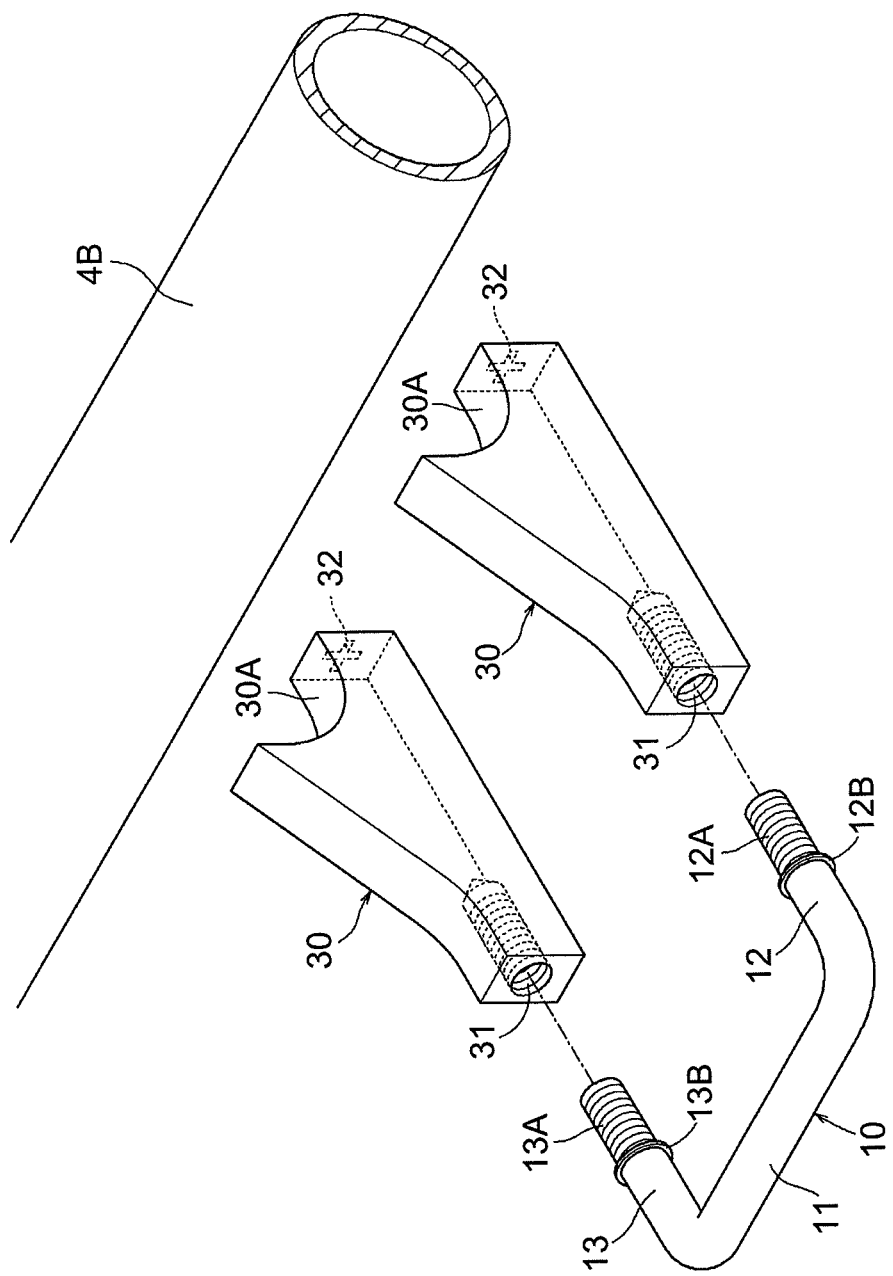
FIG. 6 is an exploded perspective view of FIG. 5.
Figure 7:
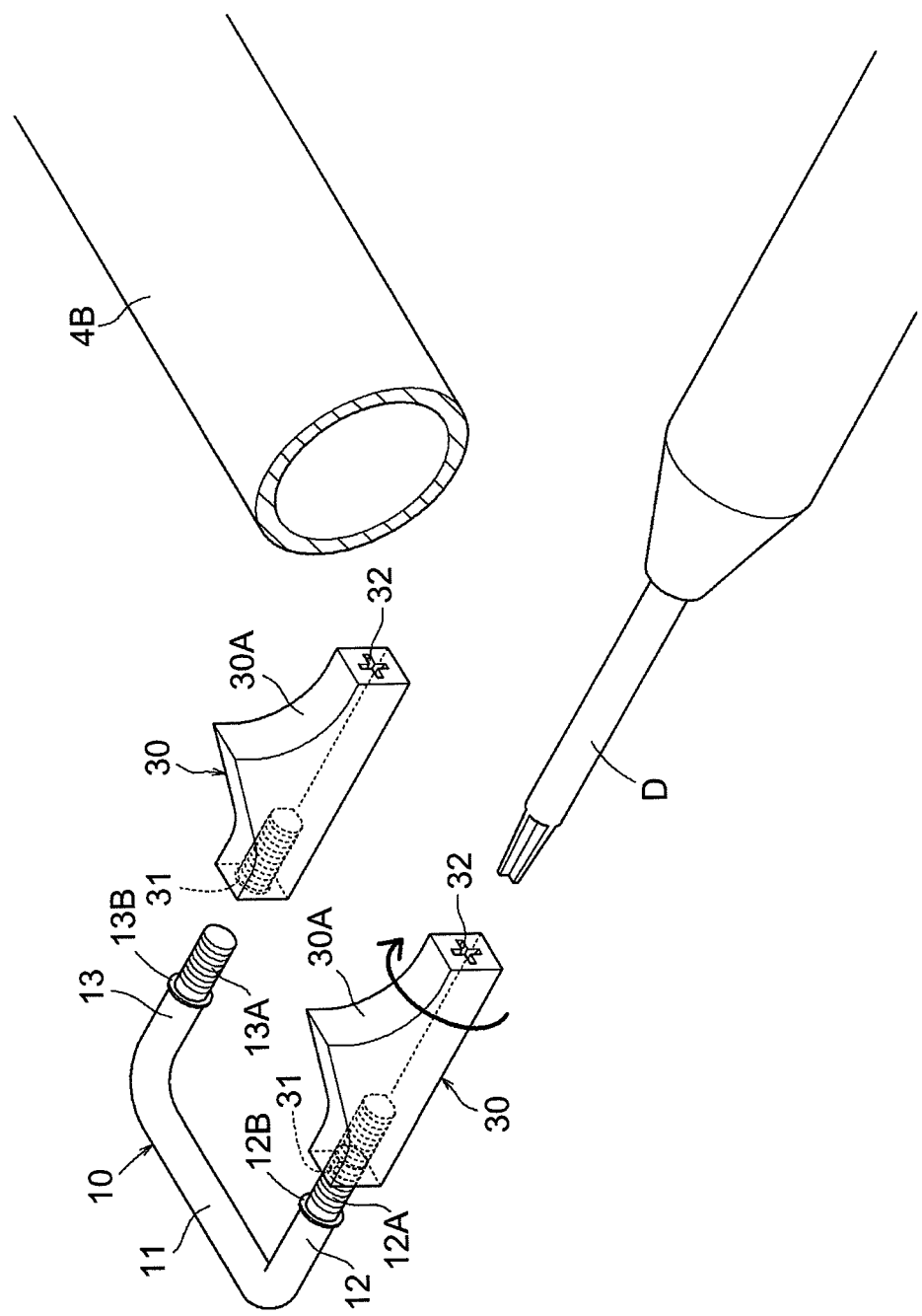
FIG. 7 is a perspective view of FIG. 6 as viewed from a back face side.
Figure 8:
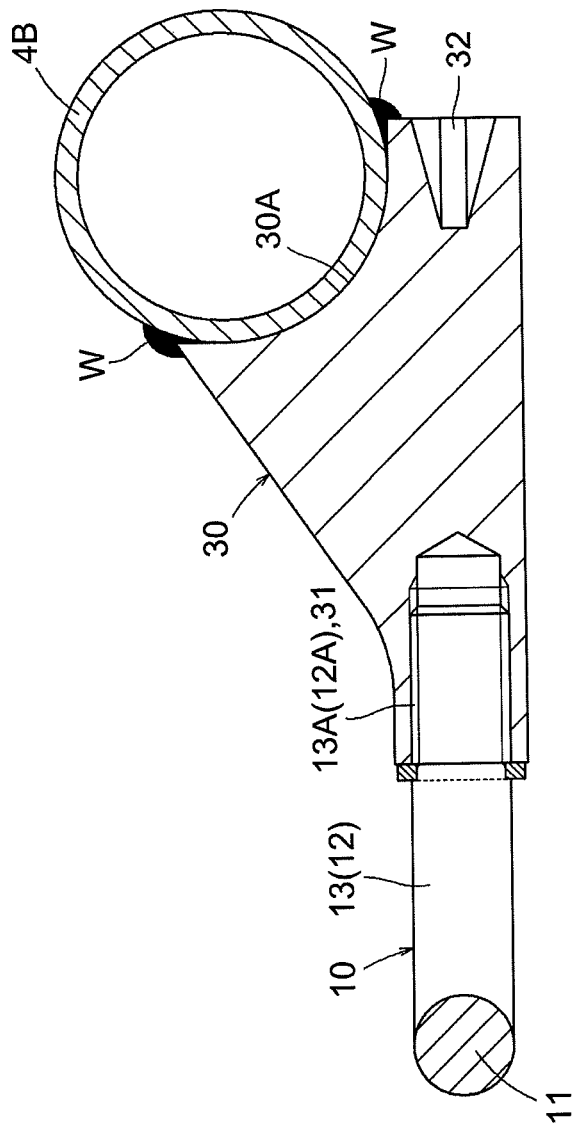
FIG. 8 is a sectional view of FIG. 5 taken along a line VIII-VIII.

Each of the brackets 20 is formed of a member that has a larger diameter than that of the lower anchorage 10, extends straight in a front-rear direction, and is in the shape of a solid round bar. As shown in FIGS. 2 and 4, the threaded holes 21 are respectively formed at front-side end face portions of the brackets 20. Each of the threaded holes 21 is formed in the shape of a round hole to extend in the axial direction, and has an internal peripheral surface where a female thread is formed. Each of the threaded holes 21 is formed in the shape of a hole, and thus, it is possible to screw a corresponding one of the male thread portions 12A and 13A in the leg portions 12 and 13 of the lower anchorage 10 into the threaded hole 21, from the seat front side. The threaded holes 21 are configured to have threaded portions that are slightly longer than the male thread portions 12A and 13A in the axial direction.

Figure 3:
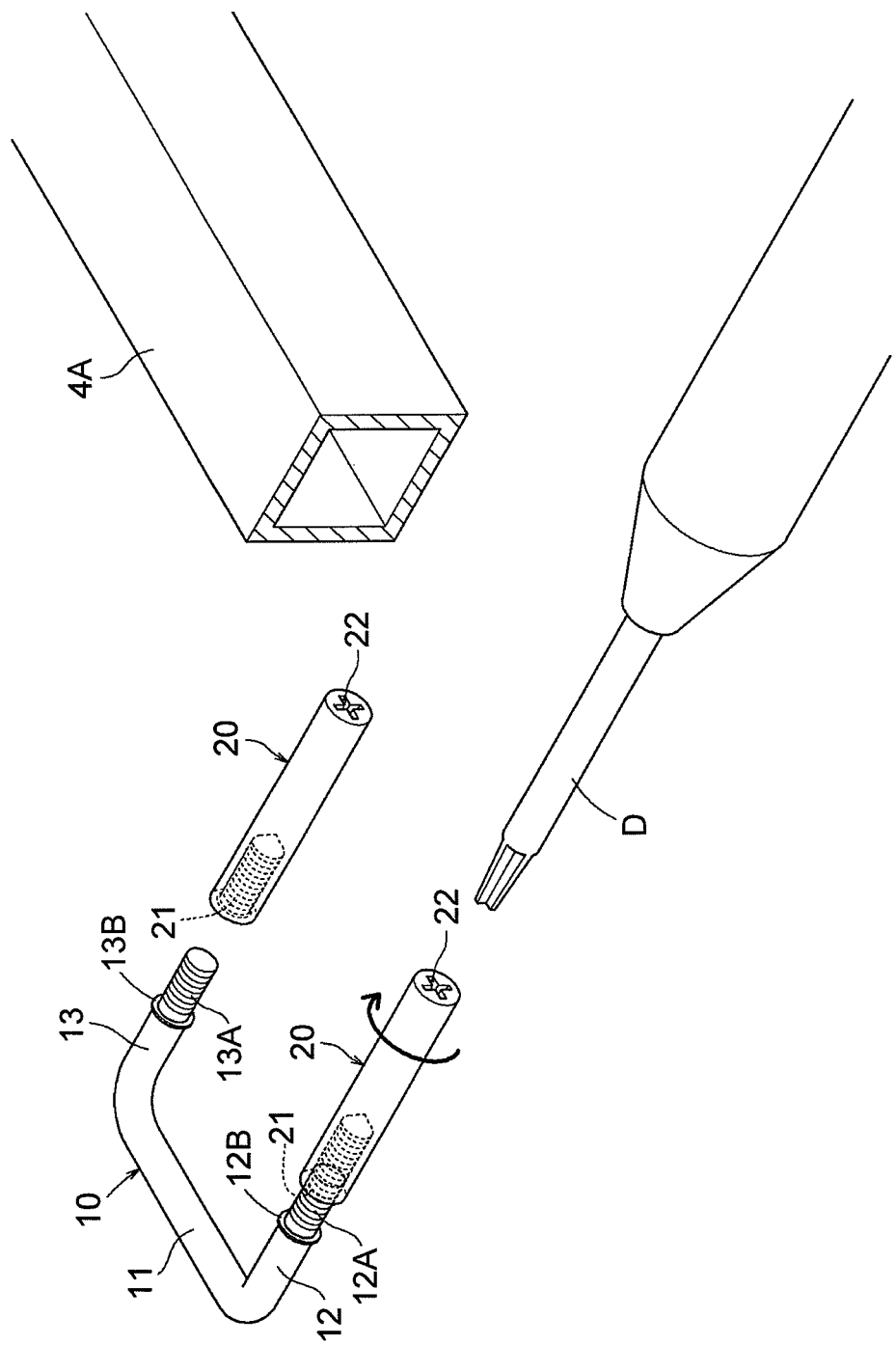
FIG. 3 is a perspective view of FIG. 2 as seen from a back face side.

As shown in FIG. 3, cross grooves 22, into which a tip of a screw driver D for cross-recessed screws can be fitted, are respectively formed in rear-side end face portions of the brackets 20. The brackets 20 are individually screwed to and assembled to the leg portions 12 and 13 of the lower anchorage 10 respectively, as follows. First, one of the brackets 20 is set in a state where the threaded hole 21 thereof contacts the distal end of the leg portion 12 (13), with respect to the corresponding leg portion 12 (13) of the lower anchorage 10. Subsequently, the tip of the screw driver D for cross-recessed screws is fitted into the cross groove 22 of the bracket 20, and the screw driver D for cross-recessed screws is rotated in a fastening direction. Thus, the threaded hole 21 of the bracket 20 is screwed to the male thread portion 12A (13A) of the corresponding leg portion 12 (13) of the lower anchorage 10, and the bracket 20 is fastened at a position at which the front-side end face portion of the bracket 20 is pressed against the flange 12B (13B) of the leg portion 12 (13) as shown in FIG. 4. Thus, the bracket 20 is firmly and integrally fastened to the leg portion 12 (13).

Due to the above-described connection, the bracket 20 is integrally assembled to the leg portion 12 (13) by the thread engagement structure, with the contours of the bracket 20 and the leg portion 12 (13) being in contact with each other in the front-rear direction. Subsequently, the other bracket 20 is screwed and fastened in the same manner to the other corresponding leg portion 13 (12) of the lower anchorage 10 through the use of the screw driver D for cross-recessed screws. Thus, the brackets 20 are firmly and integrally fastened to the leg portions 12 and 13 of the lower anchorage 10 respectively.

Next, the brackets 20 that are fastened to the leg portions 12 and 13 in the sides of the lower anchorage 10 are brought into contact with a bottom face portion of the quadrangular tubular lower pipe 4A. The brackets 20 and the lower pipe 4A are welded along their contact locations to be integrally connected to each other. Thus, the lower anchorage 10 is firmly and integrally connected to the lower pipe 4A via the brackets 20. Specifically, the brackets 20 are welded and integrally connected to the lower pipe 4A, and therefore, the screwed portions (i.e., the screwed thread portions) of the anchorage 10 are stopped from rotating with respect to the brackets 20, and the fastening is prevented from being loosened. Thus, the lower anchorage 10 is firmly and integrally connected to the brackets 20 without using welding.

Each of the brackets 20 is in the shape of a round bar that extends straight in the front-rear direction. Therefore, when the brackets 20 are brought into contact with the bottom face portion of the lower pipe 4A, the upper face portion of each bracket 20 always contacts the bottom face portion of the lower pipe 4A such that a certain contact area is ensured, regardless of the orientation of the bracket 20 in the rotational direction at the time when the bracket 20 is screwed and fastened to a corresponding one of the leg portions 12 and 13 of the lower anchorage 10. Accordingly, the brackets 20 can be appropriately welded to the bottom face portion of the lower pipe 4A while ensuring the stable contact area. Due to the above-described connection, the lower anchorage 10 projects in the U shape toward the seat front side from the lower pipe 4A via the brackets 20, and is fixed to and firmly supported by the lower pipe 4A.

To summarize the above, the seat 1 according to the embodiment is configured as follows. That is, in the seat 1, the lower anchorage 10 serving as an attachment member for the child safety seat (not shown) is fixed to the lower pipe 4A (the base frame) provided on or above the floor panel F (the vehicle body), via the brackets 20. The seat 1 is configured such that the lower anchorage 10 is integrally assembled to the brackets 20 with the contours thereof being in contact with each other in the front-rear direction.

Due to this configuration, the lower anchorage 10 can be assembled to the brackets 20 in a state where the lower anchorage 10 is in contact with the brackets 20 in the front-rear direction and is supported by the brackets 20. Accordingly, the lower anchorage 10 can be assembled to the lower pipe 4A such that the lower anchorage 10 has appropriate strength.

Specifically, the lower anchorage 10 is integrally assembled to the brackets 20 in a state where the lower anchorage 10 is in contact with the brackets 20 in the front-rear direction, by the insertion connection structure. Due to this configuration, the lower anchorage 10 can be assembled to the brackets 20 in a simplified manner such that the lower anchorage 10 has appropriate strength.

Specifically, in the insertion connection structure, end portions of the lower anchorage 10 are respectively inserted into the brackets 20 such that the end portions are restrained from being pulled in a direction opposite to the direction in which the end portions are inserted into the brackets 20 and the end portions are integrally assembled to the brackets 20 in a state where the end portions are in contact with the brackets 20 in the front-rear direction. Due to this configuration, the lower anchorage 10 can be directly assembled to the brackets 20 in a simplified manner, such that the lower anchorage 10 has appropriate strength, without employing a separate fastening component such as an insertion pin.

Specifically, in the insertion connection structure, the end portions of the lower anchorage 10 are connected to the brackets 20 with the contours thereof being in contact with each other in the front-rear direction, by engagement of the threads (i.e., by engagement of the threads of the end portions and the threads of the brackets 20). Due to this simple configuration that makes it possible to manually assemble the lower anchorage 10 to the brackets 20, the lower anchorage 10 can be assembled to the brackets 20 such that the lower anchorage 10 has appropriate strength.

The lower anchorage 10 is formed of a bent wire. Both the ends thereof (at least one end thereof) are respectively inserted into and fastened to the brackets 20 by engagement of the threads (i.e., by engagement of the threads of the ends (at least one end) and the threads of the brackets 20) such that the lower anchorage 10 is integrally assembled to the brackets 20 in a state where the lower anchorage 10 and the brackets 20 are restrained from rotating with respect to each other (i.e., the lower anchorage 10 is restrained from rotating with respect to the brackets 20 and the brackets 20 are restrained from rotating with respect to the anchorage 10). Due to this configuration, both the ends of the lower anchorage 10 are respectively fastened to the brackets 20 by engagement of the threads (i.e., engagement of the threads of the ends and the threads of the brackets 20), and thus, both the ends of the lower anchorage 10 are stopped from rotating. Therefore, with this simple configuration, the lower anchorage 10 can be assembled to the brackets 20 such that the lower anchorage 10 has appropriate strength.

Subsequently, the configuration of the seat 1 according to a second embodiment of the invention will be described using FIGS. 5 to 8. In the embodiment, as shown in FIGS. 5 to 8, a lower pipe 4B that may be regarded as "base frame" of the invention is formed in the shape of a cylinder, instead of the shape of a quadrangular tube. Each of brackets 30 respectively screwed and fastened to the end portions of the lower anchorage 10 is configured to have the shape of a substantially triangular solid block in a lateral view such that the an upper portion of the bracket 30 extends obliquely upward in a direction toward the seat rear side (i.e., the height of the bracket 30 increases in the direction toward the seat rear side), instead of the shape of a solid round bar.

As is the case with the configuration of the brackets 20 in the first embodiment, the brackets 30 are configured such that threaded holes 31 that are respectively screwed to the male thread portions 12A and 13A of the leg portions 12 and 13 of the lower anchorage 10 are formed in front-side end face portions of the brackets 30, and that cross grooves 32 into which the screw driver D for cross-recessed screws can be fitted are formed in rear-side end face portions of the brackets 30. However, each of the brackets 30 is configured such that a fitting face 30A, which is recessed in the shape of a circular arc face so as to be fitted to an outer peripheral face of the cylindrical lower pipe 4B, is formed on a rear end-side upper face portion of the bracket 30.

The brackets 30 are welded to the lower pipe 4B along their mutual contact locations in a state where the fitting faces 30A contact the outer peripheral face of the lower pipe 4B from the seat front side. Thus, the brackets 30 are widely welded in a circumferential direction along the outer peripheral face of the lower pipe 4B and are firmly and integrally connected to the lower pipe 4B (at the welding locations W). Specifically, the brackets 30 are widely welded to the lower pipe 4B in the circumferential direction along the mutual contact locations, in a state where the fitting faces 30A of the brackets 30 are in surface contact with the outer peripheral face of the lower pipe 4B from the seat front side and the seat lower side, that is, the fitting faces 30A are in surface contact with the outer peripheral face of the lower pipe 4B from the outer peripheral side over a range of 90° or more, the range extending beyond a front end portion and a lower end portion of the outer peripheral face of the lower pipe 4B in the circumferential direction.

The configuration of portions other than the above-described portions is identical to the configuration in the first embodiment. Therefore, the same reference symbols as in the first embodiment are assigned to the portions in the second embodiment, and a detailed description thereof will be omitted.

Figure 9:
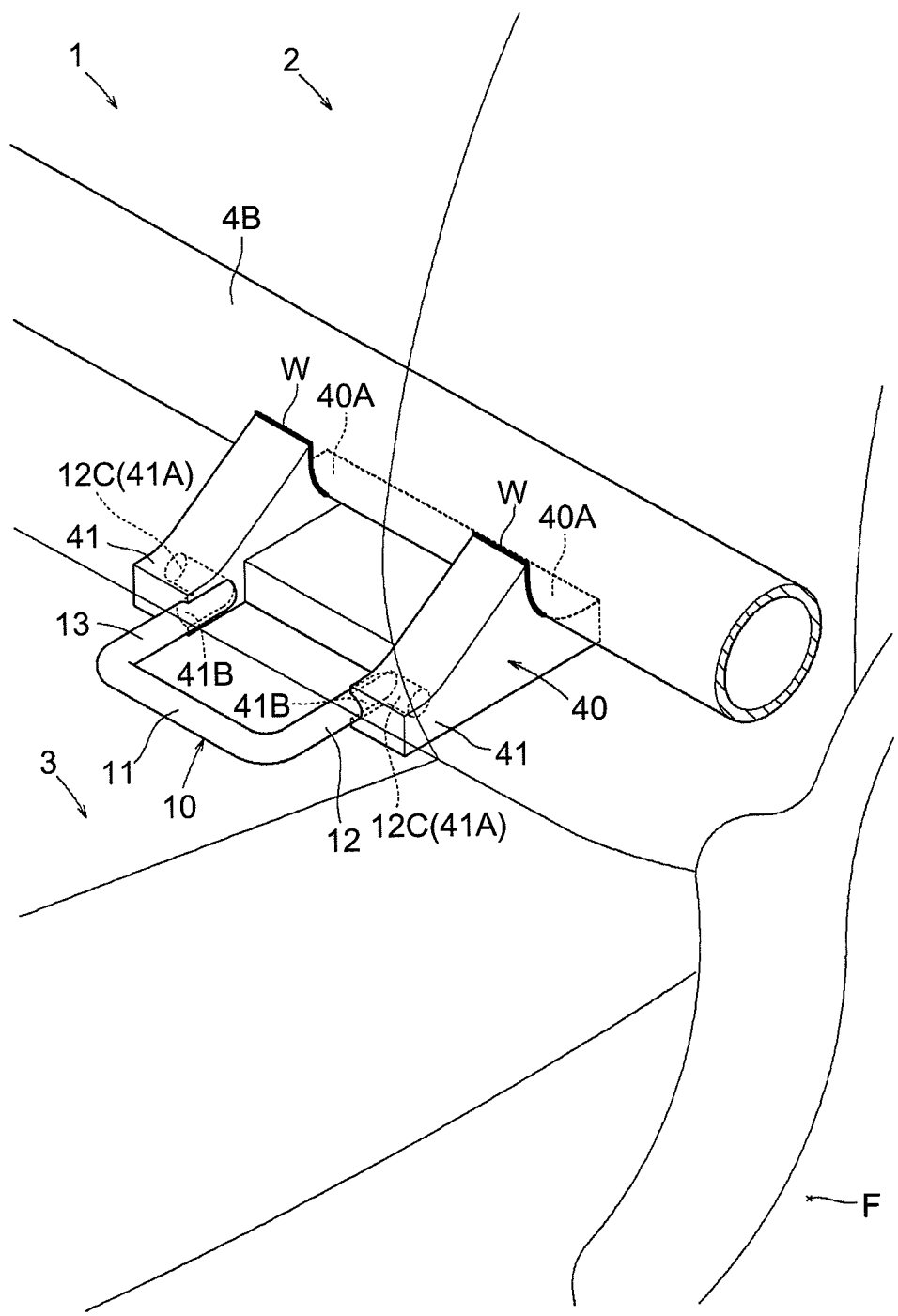
FIG. 9 is a perspective view illustrating, in an enlarged manner, the structure of a main part of a vehicle seat according to a third embodiment of the invention.
Figure 10:
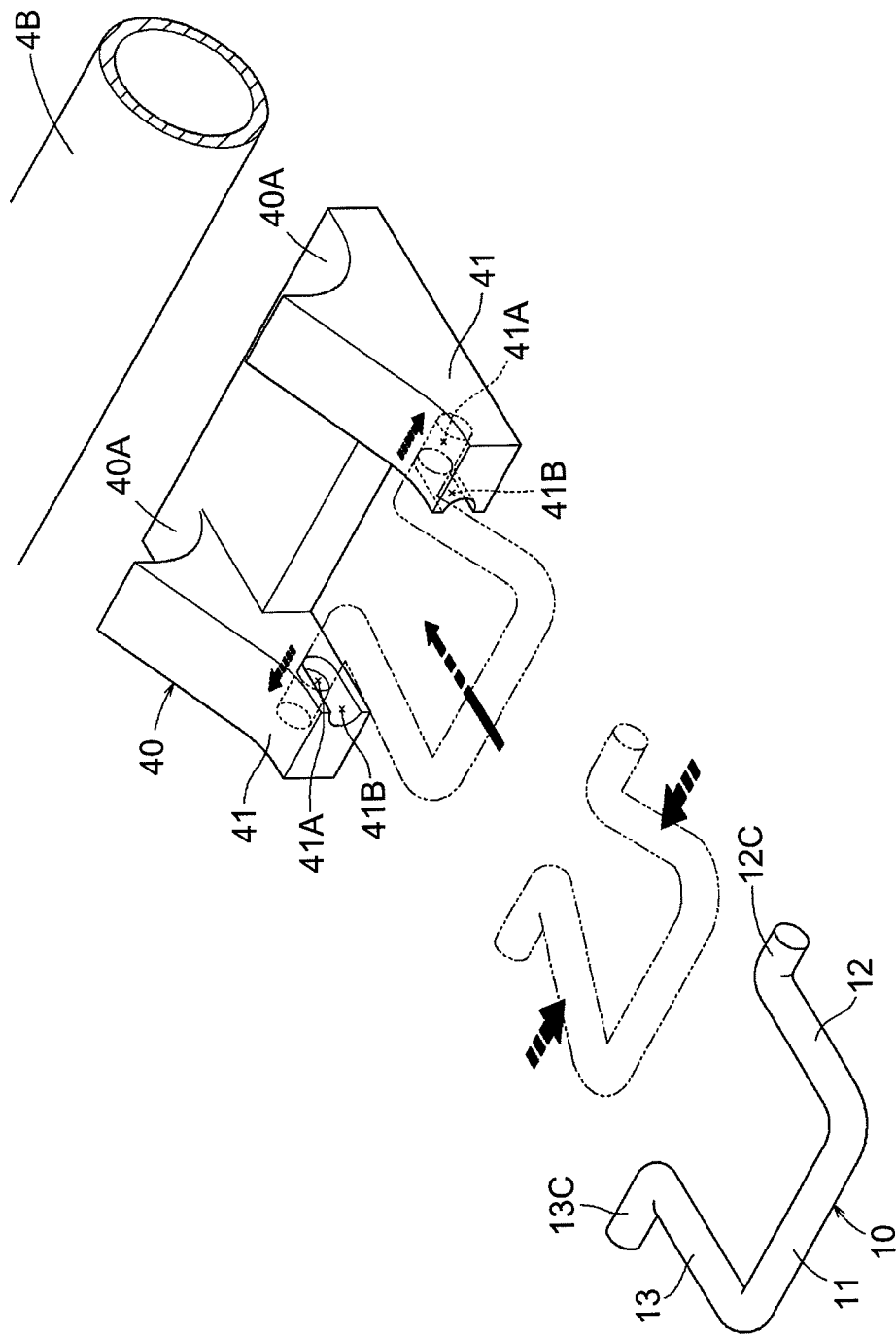
FIG. 10 is a perspective view illustrating a state where a lower anchorage in FIG. 9 is detached forward.

Subsequently, the configuration of the seat 1 according to a third embodiment of the invention will be described using FIGS. 9 and 10. In the embodiment, as shown in FIGS. 9 and 10, a bracket 40 to which the end portions of the lower anchorage 10 are assembled is provided to have the shape of a single solid block, instead of providing a pair of right and left brackets. As is the case with the brackets 30 described in the second embodiment, the bracket 40 has, on a rear end-side upper face portion thereof, fitting faces 40A that can be fitted to the outer peripheral face of the cylindrical lower pipe 4B. The bracket 40 is welded to the outer peripheral face of the lower pipe 4B (at the welding locations W) in a state where the bracket 40 is in wide surface contact with the outer peripheral face of the lower pipe 4B in the circumferential direction.

The bracket 40 is configured such that projection portions 41 that project toward the seat front side are formed at two locations, namely, right and left locations in a front end portion of the bracket 40. Also, insertion holes 41A in the shape of a round hole, and fitting grooves 41B that are recessed so as to extend straight toward the seat front side from the insertion holes 41A along mutually opposed inner lateral face portions of the projection portions 41 are formed in the inner lateral face portions of the projection portions 41. The projection portions 41 are bilaterally symmetrically to each other.

On the other hand, the lower anchorage 10 is configured such that hook portions 12C and 13C that are bent perpendicularly toward mutually opposed outer sides are formed at distal end portions of the pair of the right and left leg portions 12 and 13 which are formed by bending a steel wire in the shape of a solid round bar into the substantially U shape in a plan view. In the lower anchorage 10, the leg portions 12 and 13 can be elastically pressed such that the width between the leg portions 12 and 13 is reduced by applying forces to the leg portions 12 and 13 from both sides of the leg portions 12 and 13.

The lower anchorage 10 is assembled to the bracket 40 as follows. First, as shown in FIG. 10, the leg portions 12 and 13 of the lower anchorage 10 are elastically pressed such that the width between the leg portions 12 and 13 is reduced by applying forces thereto from both sides thereof. Then, in this state, the hook portions 12C and 13C that are bent outward from the distal end portions of the leg portions 12 and 13 of the lower anchorage 10 are moved to positions at which the hook portions 12C and 13C are aligned with the insertion holes 41A that are formed in the projection portions 41 of the bracket 40, and then, the pressed leg portions 12 and 13 are released. Thus, the hook portions 12C and 13C are respectively inserted into the insertion holes 41A of the bracket 40 due to the effect of resilient forces (elastic forces) resulting from restoring deformation of the lower anchorage 10, and the leg portions 12 and 13 are fitted in the fitting grooves 41B which are formed in the inner lateral face portions of the projection portions 41 of the bracket 40.

Due to the above-described assembly, the lower anchorage 10 is firmly supported by the bracket 40 with the contours of the lower anchorage 10 and the bracket 40 being in contact with each other in the front-rear direction, while the hook portions 12C and 13C are inserted into the insertion holes 41A. Further, the lower anchorage 10 is assembled to the bracket 40 in a state where the leg portions 12 and 13 are fitted in the fitting grooves 41B formed in the projection portions 41 of the bracket 40. Thus, the lower anchorage 10 is maintained in state in which the lower anchorage 10 is restrained from performing bobbing in the height direction around the hook portions 12C and 13C with respect to the bracket 40 and the lower anchorage 10 is fixed at a fixed position.

Due to the configuration, the lower anchorage 10 and the bracket 40 can be firmly and integrally connected to each other by the simple connection structure using only insertion, without providing any thread engagement structure between the lower anchorage 10 and the bracket 40. The configuration of portions other than the above-described portions is identical to the configuration in the first or second embodiment. Therefore, the same reference symbols as in the first or second embodiment are assigned to the portions in the third embodiment, and a detailed description thereof will be omitted.

Figure 11:
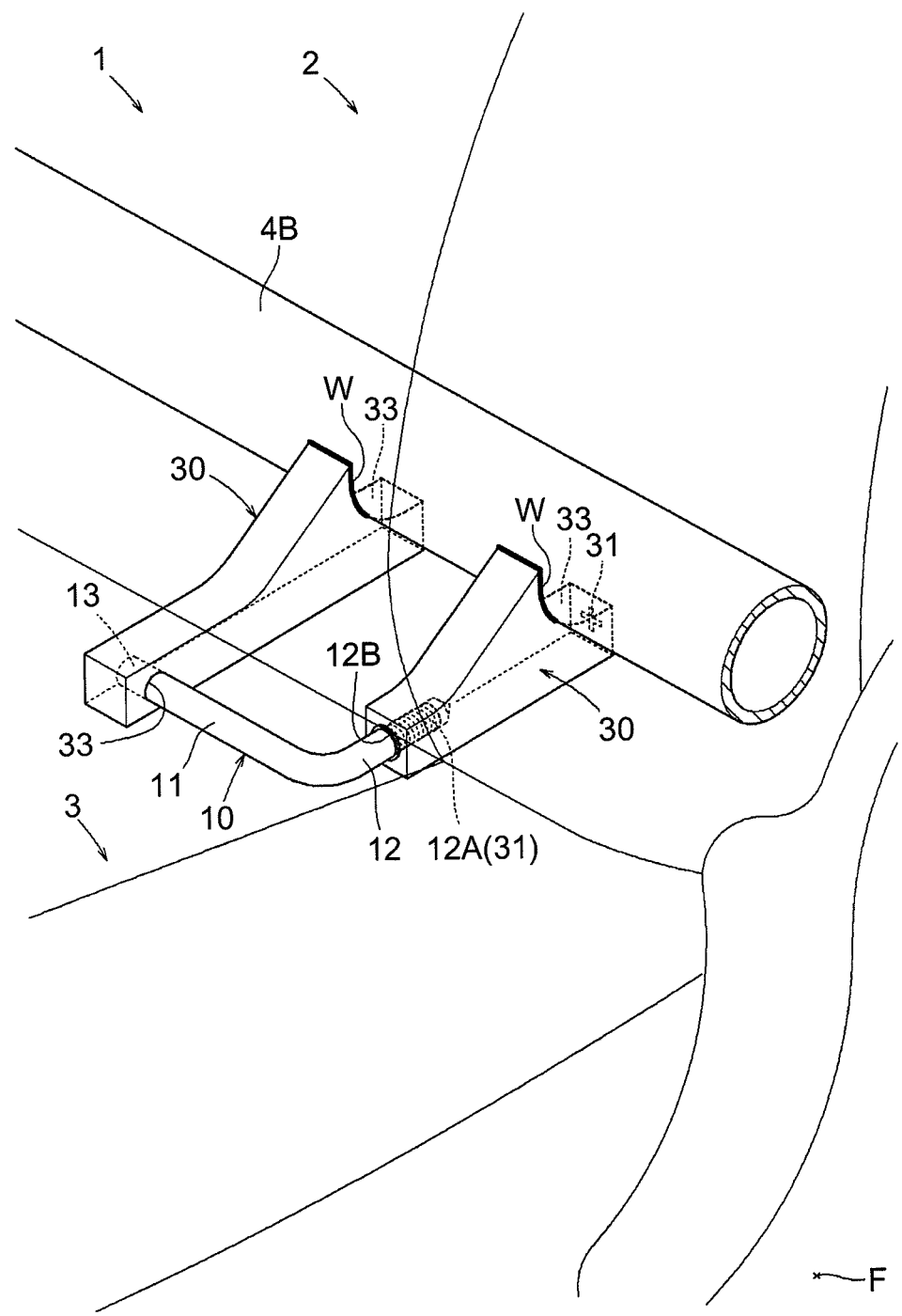
FIG. 11 is a perspective view illustrating, in an enlarged manner, the structure of a main part of a vehicle seat according to a fourth embodiment of the invention.
Figure 12:
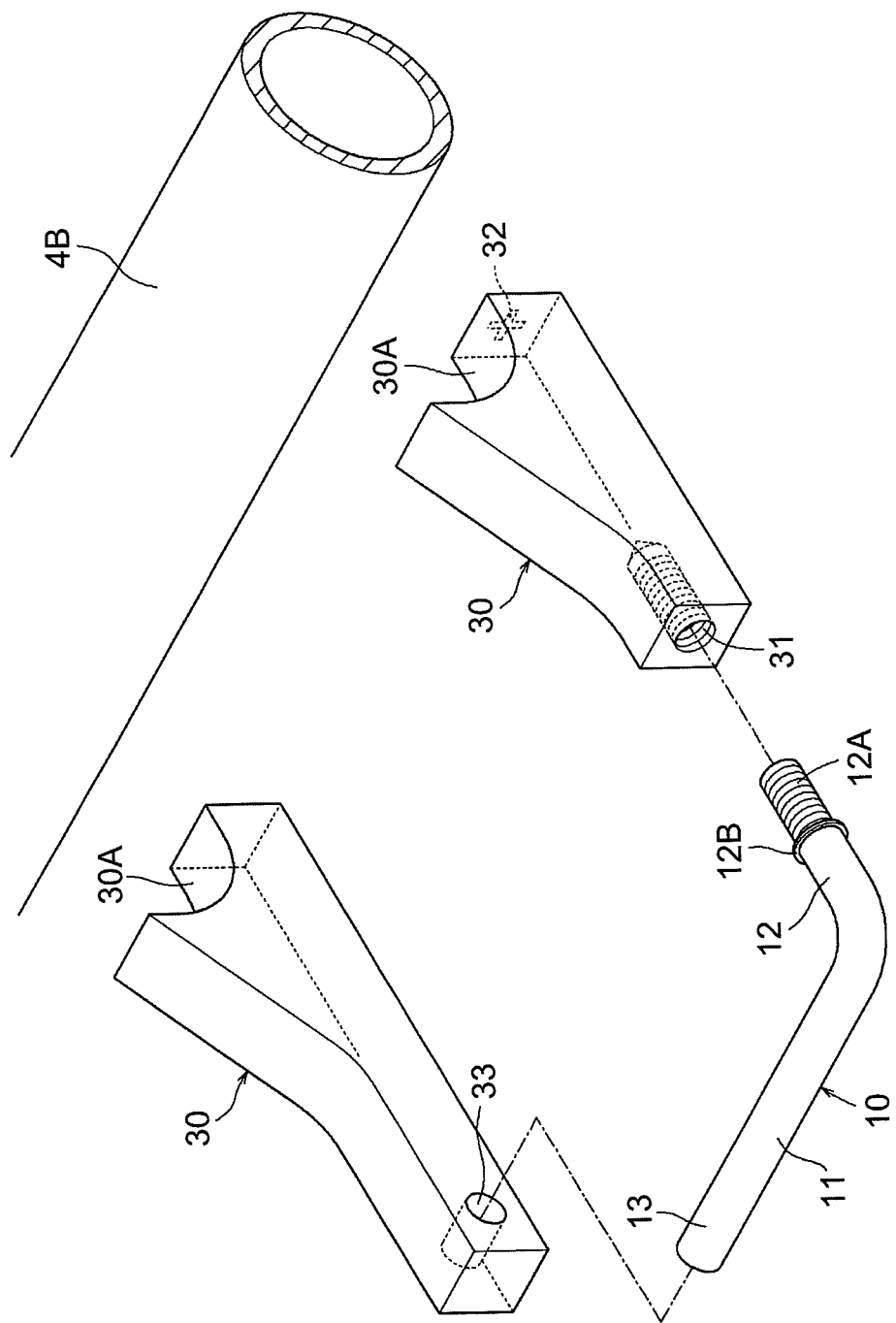
FIG. 12 is an exploded perspective view of FIG. 11.

Subsequently, the configuration of the seat 1 according to a fourth embodiment of the invention will be described using FIGS. 11 and 12. In the embodiment, as shown in FIGS. 11 and 12, the lower anchorage 10 is formed in an L shape such that one end portion of the lower anchorage 10 extends straight without being bent from the central attachment portion 11. In the lower anchorage 10, the male thread portion 12A is formed in the end portion of the leg portion 12 that is bent from the attachment portion 11 of the lower anchorage 10, but no thread portion is formed in the leg portion 13 that extends straight from the attachment portion 11.

The lower anchorage 10 is assembled to the brackets 30 in a state where the lower anchorage 10 is firmly supported by the brackets 30, with the contours thereof being in contact with each other in the front-rear direction, by screwing and fastening the leg portion 12, in which the male thread portion 12A is formed, to the threaded hole 31 of one of the brackets 30, and then inserting the other leg portion 13, in which no thread portion is formed, into the insertion hole 33 formed in the inner lateral face portion of the other bracket 30. Then, the brackets 30 are welded and connected to the lower pipe 4B, and therefore, the lower anchorage 10 is firmly and integrally connected to the lower pipe 4B via the brackets 30 (at the welding locations W).

Specifically, the leg portion 12 that is fastened to the bracket 30 by engagement of the threads (i.e., by engagement of the threads of the leg portion 12 and the threads of the bracket 30) is stopped from rotating by inserting the other leg portion 13 into the bracket 30. Thus, the lower anchorage 10 is firmly and integrally assembled to the brackets 30 in a state where the lower anchorage 10 is prevented from being loosened with respect to the brackets 30. Due to this simple configuration, the lower anchorage 10 can be assembled to the brackets 30 such that the lower anchorage 10 has appropriate strength. The configuration of portions other than the above-described portions is identical to the configuration in the first or second embodiment. Therefore, the same reference symbols as in the first or second embodiment are assigned to the portions in the fourth embodiment, and a detailed description thereof will be omitted.

Figure 13:
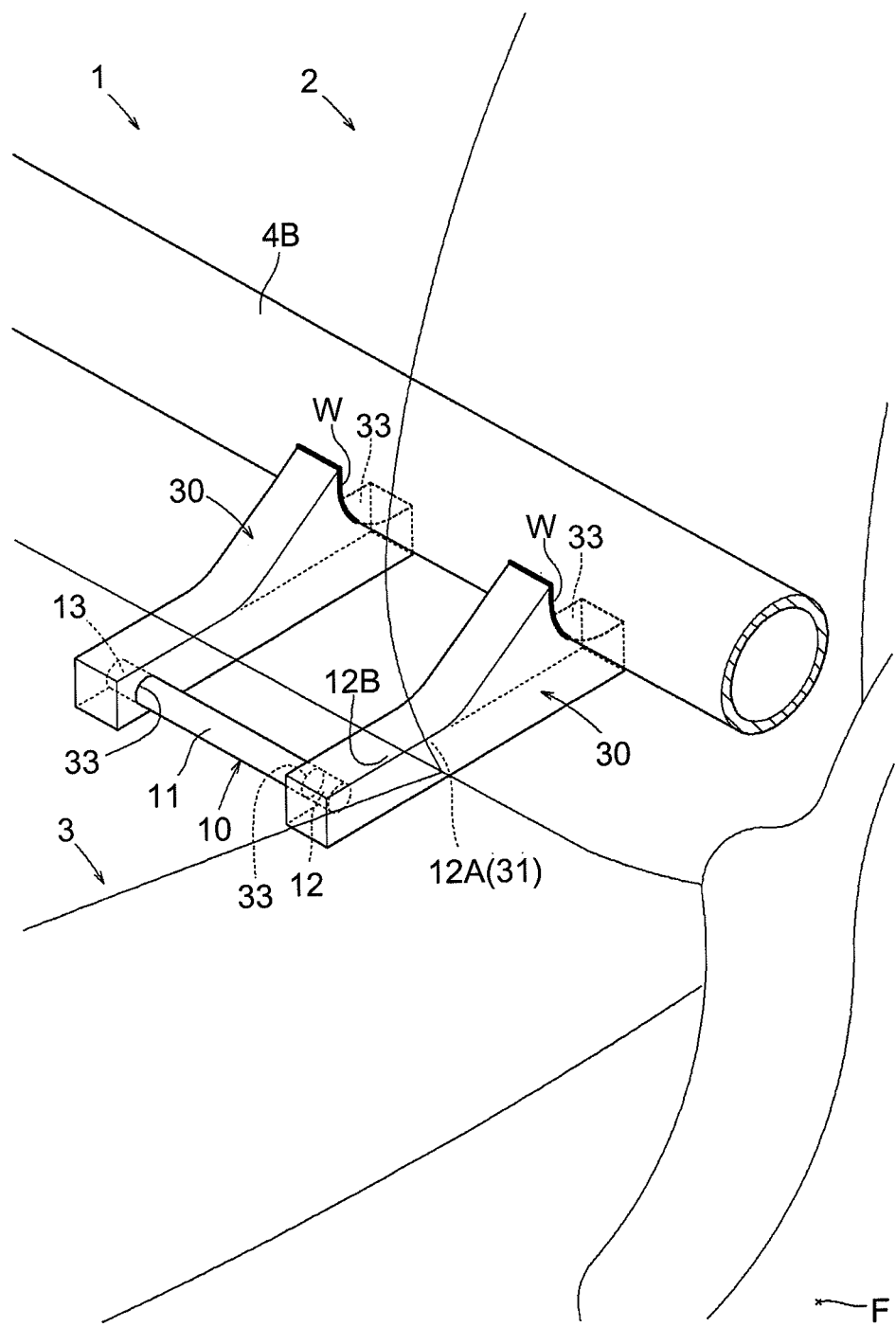
FIG. 13 is a perspective view illustrating, in an enlarged manner, the structure of a main part of a vehicle seat according to a fifth embodiment of the invention.

Subsequently, the configuration of the seat 1 according to a fifth embodiment of the invention will be described using FIGS. 13 and 14. In the embodiment, as shown in FIGS. 13 and 14, each of the end portions in both sides of the lower anchorage 10 is formed in the shape of a straight lateral bar that extends straight without being bent from the central attachment portion 11. The leg portions 12 and 13 in both sides of the lower anchorage 10 are inserted into the insertion holes 33 formed in the inner lateral face portions of the brackets 30 on the both sides. Thus, the lower anchorage 10 is assembled to the brackets 30 in a state where the lower anchorage 10 is firmly supported by the brackets 30, with the contours thereof being in contact with each other in the front-rear direction. The brackets 30 are welded and connected to the lower pipe 4B, and therefore, the leg portions 12 and 13 are prevented from falling off from the brackets 30. Thus, the lower anchorage 10 is firmly and integrally connected to the lower pipe 4B via the brackets 30 (at the welding locations W). Due to this simple configuration, the lower anchorage 10 can be assembled to the brackets 30 such that the lower anchorage 10 has appropriate strength. The configuration other than the above is identical to the configuration mentioned in the first or second embodiment. Therefore, the same reference symbols as in the first or second embodiment are assigned to the portions in the fifth embodiment, and a detailed description thereof will be omitted.

Although the five embodiments of the invention have been described, the invention can be implemented in various modes in addition to the above-described embodiments. For example, the configuration regarding "the vehicle seat" of the invention may be also widely applied to seats applied to vehicles other than automobiles, for example, railroad vehicles, or seats available for various vehicles such as aircrafts and vessels, as well as seats of automobiles other than rear seats thereof.

In each of the above-described embodiments, the lower anchorage is made of iron, and the brackets and the base frame (the lower pipe) are made of aluminum alloy. However, the lower anchorage and the brackets may be made of the same material, or may be made of different materials. Specifically, various metal materials such as magnesium alloy are applicable in addition to iron and aluminum alloy. Further, non-metal materials such as resin materials are also applicable.

The lower anchorage according to the invention is not limited to the lower anchorage that is assembled to the brackets in a state where the lower anchorage is directly inserted into the brackets such that lower anchorage is in contact with the brackets in the front-rear direction so as to be prevented from falling off from the brackets. The lower anchorage may be assembled to the brackets in a state where a retaining pin, which is a separate component, is inserted through the lower anchorage and each of the brackets such that the lower anchorage is in contact with the brackets so as to be prevented from falling off from the brackets. Further, the lower anchorage may be assembled to the brackets in a state where the lower anchorage is prevented from falling off from the brackets by frictional resistance caused by press fitting.

The shape of the base frame to which the brackets are attached is not limited to the cylindrical shape or the quadrangular tubular shape. The base frame may be formed of a hollow or solid member having any of various cross-sectional shapes.

What is claimed is:

1. A vehicle seat comprising:
    a lower anchorage that serves as an attachment member for a child safety seat;
    a bracket having a circular hole having a longitudinal axis extending in a vehicle seat front-rear direction; and
    a base frame that is provided on or above a vehicle body, wherein:
    the lower anchorage is fixed to the base frame via the bracket;
    the lower anchorage is integrally assembled to the bracket, with contours of the lower anchorage and the bracket being in contact with each other in a front-rear direction; and
    a terminal end of the lower anchorage is arranged within the hole of the bracket,
    wherein the terminal end projects along the longitudinal axis, and
    wherein the lower anchorage is non-moveably fixed to the base frame via the bracket.

2. The vehicle seat according to claim 1, wherein the lower anchorage is integrally assembled to the bracket in a state where the lower anchorage is in contact with the bracket in the front-rear direction by an insertion connection structure.

3. The vehicle seat according to claim 2, wherein in the insertion connection structure, the terminal end of the lower anchorage is inserted into the bracket such that the terminal end is restrained from being pulled in a direction opposite to a direction in which the terminal end is inserted into the bracket, and the terminal end is integrally assembled to the bracket in a state where the terminal end is in contact with the bracket in the front-rear direction.

4. The vehicle seat according to claim 1, wherein the lower anchorage and the bracket comprise different materials.

5. The vehicle seat according to claim 1, wherein the lower anchorage is a unitary structure.

6. The vehicle seat according to claim 1, wherein the hole of the bracket has a shape that corresponds to a shape of an outer surface of the terminal end of the lower anchorage.

7. The vehicle seat according to claim 1, wherein the lower anchorage continuously extends along the front-rear direction from an opening of the hole of the bracket, through which the lower anchorage extends, to the terminal end of the lower anchorage.

8. The vehicle seat according to claim 1, wherein the bracket comprises a tool engagement socket.

9. The vehicle seat according to claim 1, further comprising a second bracket having a hole having a longitudinal axis, wherein the lower anchorage is fixed to the base frame via the bracket and the second bracket.

10. A vehicle seat comprising:
a lower anchorage that serves as an attachment member for a child safety seat;
a bracket having a circular hole having a longitudinal axis extending in a vehicle seat front-rear direction; and
a base frame that is provided on or above a vehicle body, wherein:
the lower anchorage is fixed to the base frame via the bracket;
the lower anchorage is integrally assembled to the bracket, with contours of the lower anchorage and the bracket being in contact with each other in a front-rear direction; and
a terminal end of the lower anchorage is arranged within the hole of the bracket,
wherein the terminal end projects along the longitudinal axis, and
wherein the lower anchorage comprises at least one flange.

11. A vehicle seat comprising:
a lower anchorage that serves as an attachment member for a child safety seat;
a bracket having a hole having a longitudinal axis; and
a base frame that is provided on or above a vehicle body, wherein:
the lower anchorage is fixed to the base frame via the bracket;
the lower anchorage is integrally assembled to the bracket, with contours of the lower anchorage and the bracket being in contact with each other in a front-rear direction; and
a terminal end of the lower anchorage is arranged within the hole of the bracket,
wherein the terminal end projects along the longitudinal axis, and
wherein the hole is a threaded hole, and the terminal end of the lower anchorage is arranged within the threaded hole of the bracket.

12. A vehicle seat comprising:
a lower anchorage that serves as an attachment member for a child safety seat;
a bracket; and
a base frame that is provided on or above a vehicle body wherein:
the lower anchorage is fixed to the base frame via the bracket;
the lower anchorage is integrally assembled to the bracket by an insertion connection structure, with contours of the lower anchorage and the bracket being in contact with each other in a front-rear direction;
in the insertion connection structure:
an end portion of the lower anchorage is inserted into the bracket such that the end portion is restrained from being pulled in a direction opposite to a direction in which the end portion is inserted into the bracket;
the end portion is integrally assembled to the bracket in a state where the end portion is in contact with the bracket in the front-rear direction; and
the end portion of the lower anchorage is connected to the bracket with contours of the end portion and the bracket being in contact with each other in the front-rear direction by engagement of threads.

13. The vehicle seat according to claim 12, wherein:
the lower anchorage comprises a bent wire; and
at least one end of the lower anchorage is fastened to the bracket by engagement of threads and another end of the lower anchorage is inserted into the bracket such that the lower anchorage is integrally assembled to the bracket in a state where the lower anchorage is restrained from rotating around the one end.

* * * * *